(12) United States Patent
Yun

(10) Patent No.: US 7,167,217 B2
(45) Date of Patent: Jan. 23, 2007

(54) LIQUID CRYSTAL DISPLAY DEVICE AND METHOD FOR MANUFACTURING THE SAME

(75) Inventor: Hae Jin Yun, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 18 days.

(21) Appl. No.: 10/606,808

(22) Filed: Jun. 27, 2003

(65) Prior Publication Data
US 2004/0036816 A1 Feb. 26, 2004

(30) Foreign Application Priority Data
Aug. 23, 2002 (KR) ............... 10-2002-0050055
Apr. 1, 2003 (KR) ............... 10-2003-0020436

(51) Int. Cl.
G02F 1/36 (2006.01)
H01L 29/04 (2006.01)

(52) U.S. Cl. .......................... 349/43; 257/72
(58) Field of Classification Search .......... 349/43; 257/59, 72
See application file for complete search history.

(56) References Cited

U.S. PATENT DOCUMENTS 5,790,222 A * 8/1998 Kim ................... 349/139
5,861,635 A * 1/1999 Song .................. 257/59
5,920,083 A * 7/1999 Bae ................... 257/59
5,936,685 A * 8/1999 Ito et al. ............. 349/38
6,100,953 A * 8/2000 Kim et al. ........... 349/129
6,633,359 B1 * 10/2003 Zhang et al. ........ 349/141

FOREIGN PATENT DOCUMENTS

JP 10-153799 6/1998
JP 14-090721 3/2002

* cited by examiner

*Primary Examiner*—Tarifur R. Chowdhury
(74) *Attorney, Agent, or Firm*—McKenna Long & Aldridge LLP

(57) ABSTRACT

An LCD device includes an insulating substrate; a gate line disposed on the insulating substrate; a first data line disposed perpendicular to the gate line and separated from the gate line; a second data line disposed crossing the gate line on a same line as the first data line; a thin film transistor disposed substantially at a crossing point of the gate line and the second data line; an active layer disposed below the second data line, a source electrode, and a drain electrode of the thin film transistor; a third data line disposed perpendicular to the gate line to define a pixel region to electrically connect the first and second data lines with each other; and a pixel electrode disposal in the pixel region.

29 Claims, 20 Drawing Sheets

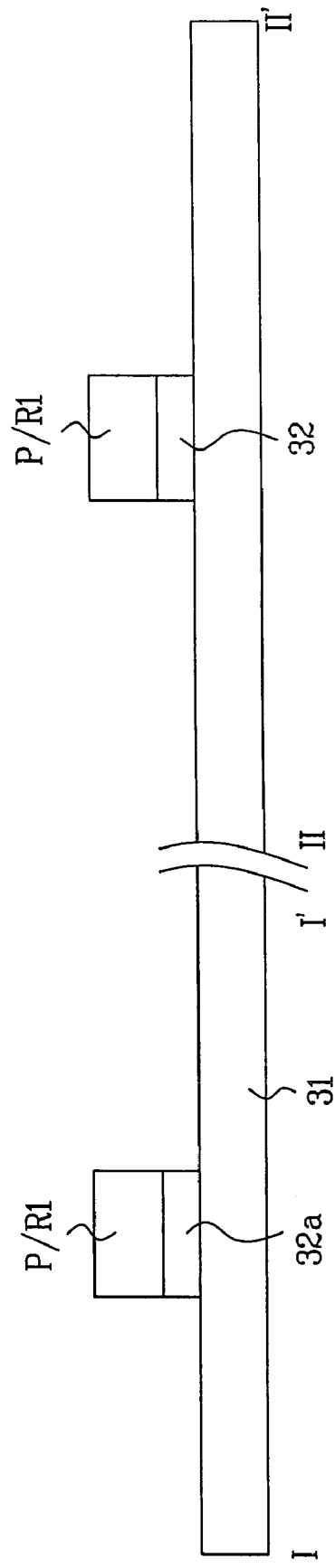

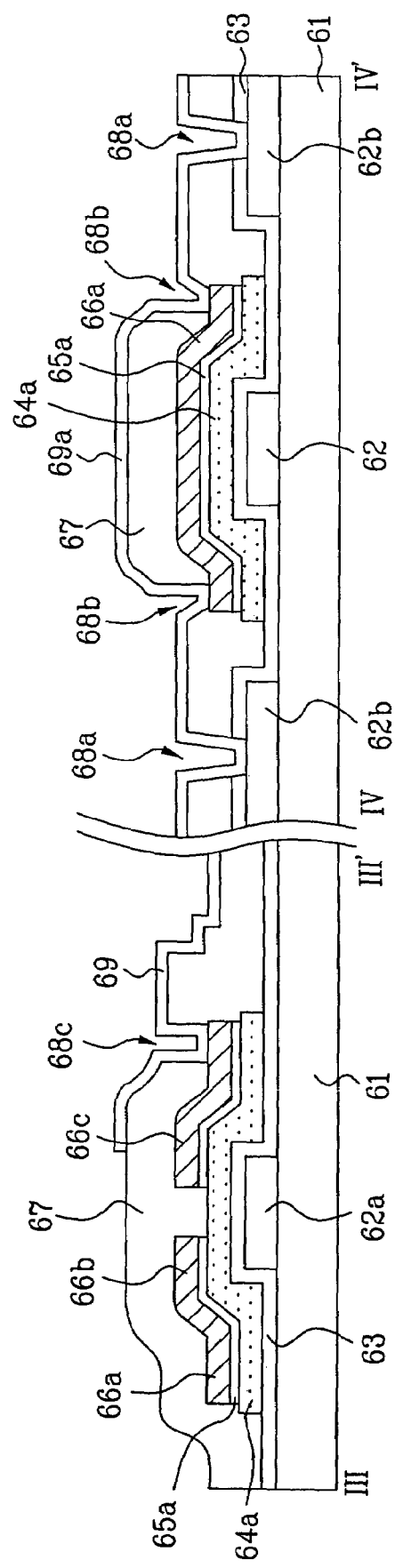

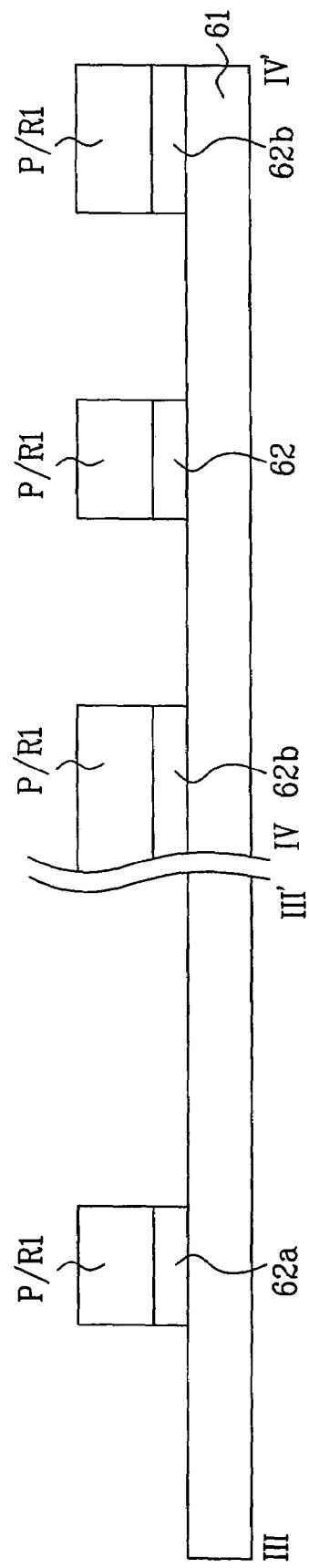

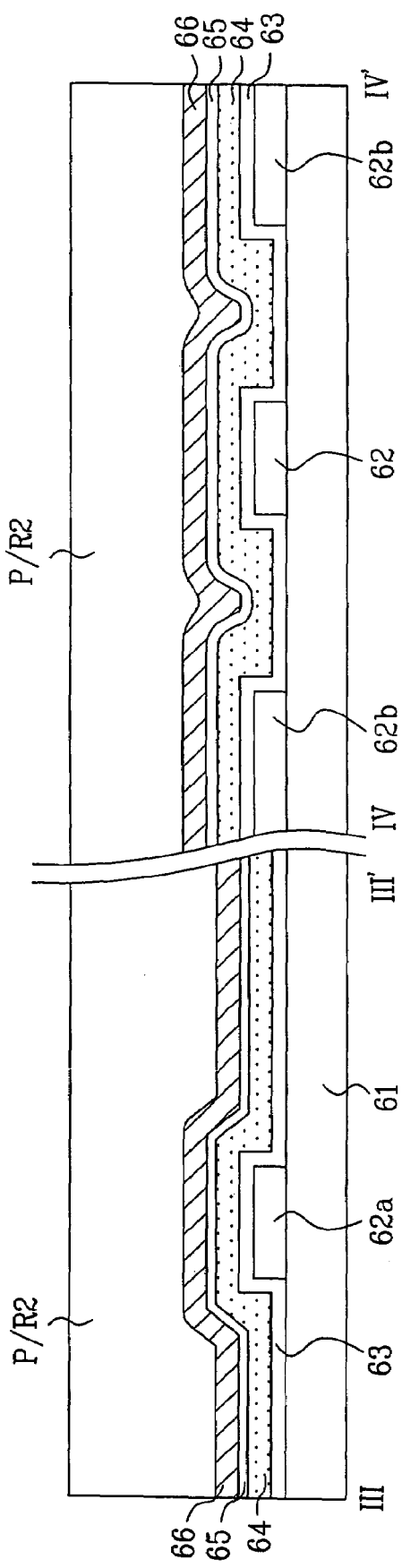

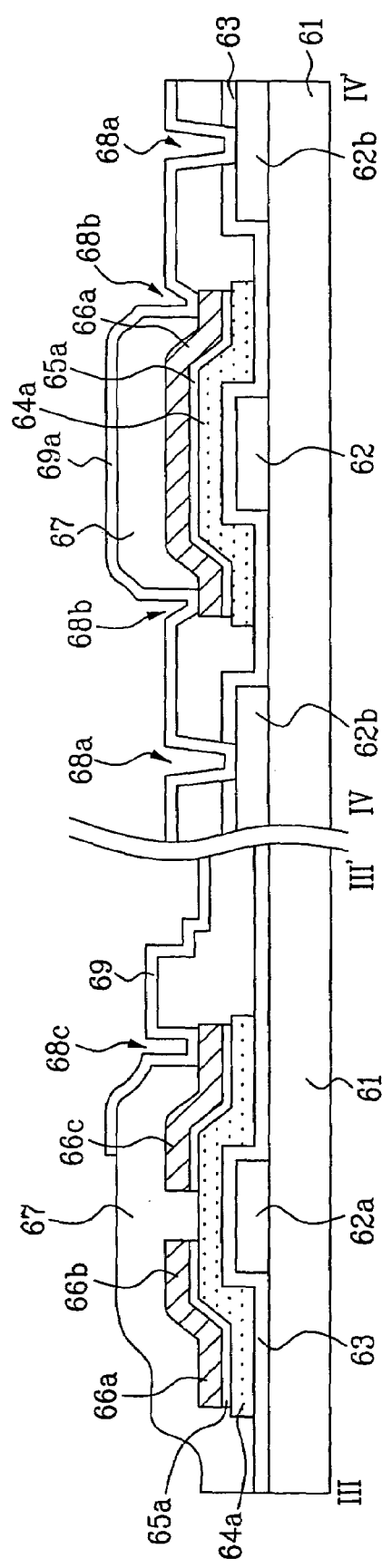

LIQUID CRYSTAL DISPLAY DEVICE AND METHOD FOR MANUFACTURING THE SAME

The present application claims the benefit of the Korean Application Nos. P2002-50055 and P2003-20436 respectively filed on Aug. 23, 2002 and Apr. 1, 2003, which are hereby incorporated by reference.

BACKGROUND OF THE INVENTION

1. Field of the Invention

The present invention relates to a liquid crystal display (LCD) device, and more particularly, to an LCD device and a method for manufacturing the same which prevents a wavy noise failure in a four-mask structure.

2. Description of the Related Art

With development of information society, demands for various display devices have increased. Accordingly, many efforts have been made to research and develop various flat display devices such as liquid crystal display (LCD), plasma display panel (PDP), electroluminescent display (ELD), and vacuum fluorescent display (VFD). Some species of the flat display devices are already applied to displays of various equipments.

Among the various flat display devices, the liquid crystal display (LCD) device has been most widely used due to advantageous characteristics of thinness, light weight, and low power consumption, whereby the LCD device substitutes for cathode ray tube (CRT). In addition to the mobile type LCD devices, such as a display for a notebook computer, LCD devices have been developed for computer monitors and televisions to receive and display broadcasting signals.

Despite various technical developments in the LCD technology with applications in different fields, research in enhancing the picture quality of the LCD device has been in some respects lacking as compared to other features and advantages of the LCD device. To use LCD devices in various fields as a general display, the key to developing LCD devices lies on whether the LCD device can implement a high quality picture, such as high resolution and high luminance with a large-sized screen while still maintaining a light weight, thinness, and a low power consumption.

The general LCD device includes an LCD panel for displaying a picture image, and a driving portion for applying a driving signal to the LCD panel. The LCD panel includes first and second glass substrates bonded to each other with a predetermined spacing, and a liquid crystal layer injected between the first and second glass substrates.

The first glass substrate (TFT array substrate) includes a plurality of gate and data lines, a plurality of pixel electrodes and a plurality of thin film transistors. Here, the plurality of gate lines are formed on the first glass substrate at fixed intervals in one direction, and the plurality of data lines are formed at fixed intervals perpendicular to the plurality of gate lines. Then, the plurality of pixel electrodes of a matrix arrangement are formed in pixel regions defined by the plurality of gate and data lines crossing each other. The plurality of thin film transistors (TFT) are switched according to signals of the gate lines for transmitting signals of the data lines to the respective pixel electrodes. Also, the second glass substrate (color filter substrate) includes a black matrix layer to block light from regions of the second glass substrate except the pixel regions, R/G/B color filter layer to display colors, and a common electrode to display a picture image. In an in-plane switching mode LCD device, the common electrode is formed on the first glass substrate.

Next, a predetermined space is maintained between the first and second glass substrates by spacers, and the first and second substrates are bonded to each other by a sealant having a liquid crystal injection inlet. At this time, the liquid crystal layer is formed according to a liquid crystal injection method, in which the liquid crystal injection inlet is dipped into a container having liquid crystal while maintaining a vacuum state in the predetermined space between the first and second glass substrates. That is, the liquid crystal is injected between the first and second substrates by an osmotic action. Then, the liquid crystal injection inlet is sealed with the sealant.

The LCD device is driven according to an optical anisotropy and a polarizability of liquid crystal. Herein, liquid crystal molecules are aligned with directional characteristics so that the liquid crystal molecules respectively have long and thin shapes. In this respect, an electric field is applied to the liquid crystal to control the alignment direction of the liquid crystal molecules. That is, if the alignment direction of the liquid crystal molecules is controlled by the electric field, the light is refracted to the alignment direction of the liquid crystal molecules according to the optical anisotropy of the liquid crystal, thereby displaying the picture image. Accordingly, research and study for the TFT selectively driving the pixel electrode has focused on decreasing of the manufacturing cost by improving yield and productivity. Thus, it is required to improve TFT structure, and amorphous or polycrystalline silicon characteristics to decrease an ohmic contact resistance and to prevent lines/circuits from being disconnected.

The TFT structure has been actively studied for obtaining the large-sized and low-price LCD device and high productivity. The TFT is classified into a top gate type TFT and a bottom gate type TFT according to a position of a gate electrode. The bottom gate type TFT is referred to as an inverted staggered structure, and the top gate type TFT is referred to as a normal staggered structure. In the bottom gate type TFT, the gate electrode is first formed on a substrate. Meanwhile, in the top gate type TFT, the gate electrode is formed on a substrate after forming source/drain electrodes.

Hereinafter, an example using four masks in a method for manufacturing the bottom gate type LCD device forming the source/drain electrodes after forming the gate electrode will be described as follows. A related art LCD device and a method for manufacturing the same will be described with reference to the accompanying drawings. FIG. 1 is an expanded plan view illustrating a unit pixel of a related art LCD device, and FIG. 2 is a cross-sectional view illustrating a related art LCD device taken along lines I–I' and II–II' of FIG. 1.

As shown in FIGS. 1 and 2, the related art LCD device includes a gate line 32 having a gate electrode 32a on a lower substrate 31, and a data line 36a being in perpendicular to the gate line 32 to define a pixel region. Then, a source electrode 36b protrudes from the data line 36a, and a drain electrode 36c is formed at a predetermined interval from the source electrode 36b. At this time, the source electrode 36b is protruding from the data line 36a to have a 'C'-shaped groove, and the drain electrode 36c is formed at the predetermined interval from the source electrode 36b inside the 'C'-shaped groove. That is, a channel region is formed in a 'C'-shape between the source and drain electrodes 36b and 36c.

The gate electrode 32a is extending from the gate line 32, and a gate insulating layer 33 is formed on an entire surface of the lower substrate 31 including the gate line 32. Then, an active layer 34a is formed on the gate insulating layer 33 above the gate electrode 32a. The active layer 34a is formed below the data line 36a, the source/drain electrodes 36b and 36c and the channel region to have an enough width to cover the data line 36a, the source and drain electrode 36b and 36c. Here, the active layer 34a may include an amorphous silicon layer. Also, an ohmic contact layer 34b is formed between the active layer 34a and the data line 36a/source electrode 36b/drain electrode 36c except the channel region. The ohmic contact layer is formed of $n^+$ amorphous silicon layer. Subsequently, a passivation layer 37 is formed on the entire surface of the lower substrate 31 including the data line 36a, and a contact hole 38 is formed in the passivation layer 37 at a predetermined portion of the drain electrode 36c. A transparent pixel electrode 39 is formed in the pixel region in contact with the drain electrode 36c through the contact hole 38.

To manufacture the LCD device having the aforementioned structure, four masks are required in the process steps. Hereinafter, the related art method for manufacturing the LCD device with the four masks will be described as follows. FIG. 3A to FIG. 3H are cross-sectional views illustrating manufacturing process steps of a related art LCD device taken along lines I–I' and II–II' of FIG. 1.

As shown in FIG. 3A, a gate metal layer is deposited on the lower substrate 31 by sputtering, and a first photoresist P/R1 is deposited on the gate metal layer. Then, an exposure and developing process is performed thereon by using a first mask, thereby forming a first photoresist P/R1 pattern for forming the gate line. After that, the gate metal layer is selectively removed by using the first photoresist P/R1 pattern as a mask, whereby the gate line 32 (FIG. 1) and the gate electrode 32a extending from the gate line 32 are formed on the lower substrate 31. Subsequently, the first photoresist P/R1 pattern is removed. Herein, the gate metal layer may be formed in a single-layer structure or dual-layer structure of chrome Cr, molybdenum Mo and aluminum Al.

Referring to FIG. 3B, the gate insulating layer 33 is formed on the entire surface of the lower substrate 31 including the gate line 32 and the gate electrode 32a. After forming the gate insulating layer 33, first and second semiconductor layers 34 and 35 (amorphous silicon layer and $n^+$ amorphous silicon layer) and a data metal layer 36 are sequentially deposited on the lower substrate 31. Then, a second photoresist P/R2 is deposited on the data metal layer 36.

Next, as shown in FIG. 3C, an exposure and developing process is performed on the data metal layer 36 by using a second mask (half-tone mask), thereby forming a second photoresist P/R2 pattern for forming the data line at a predetermined thickness. The second mask (half-tone mask) is formed to completely exclude the light from the portion corresponding to data line, and to partially transmit the light in the portion corresponding to the channel region of the thin film transistor. Accordingly, the developed second photoresist P/R2 pattern is maintained at the predetermined (deposited) thickness in the portions of the data line and the source/drain electrodes while the developed second photoresist P/R2 pattern is relatively thin in the channel region of the thin film transistor. Next, the data metal layer 36 and the first and second semiconductor layers 34 and 35 are removed in wet or dry process by using the second photoresist P/R2 pattern.

As shown in FIG. 3D, the second photoresist P/R2 corresponding to the channel region of the thin film transistor is removed by ashing the second photoresist P/R2 pattern. At this time, the second photoresist P/R2 pattern totally becomes thin and narrow. Thus, the widths of the data line and the source/drain electrodes formed in the next process steps will be changed.

Referring to FIG. 3E, after the ashing process, the data metal layer 36 and the second semiconductor layer 35 corresponding to the channel region of the thin film transistor are etched by using the second photoresist P/R2 pattern as the mask. After forming the thin film transistor having the data line 36a, the source and drain electrodes 36b and 36c, the second photoresist P/R2 pattern is removed. Accordingly, the first semiconductor layer 34 corresponding to the channel region is exposed, thereby dividing the source and drain electrodes 36b and 36c from each other. Also, the active layer 34a comprising the first semiconductor layer 34 is formed on the gate insulating layer 33, and the ohmic contact layer 35a is formed on the active layer 34a except the channel region. At this time, the gate insulating layer 33 is formed of an inorganic insulating material such as oxide silicon SiOx or nitride silicon SiNx. The data metal layer is formed of molybdenum Mo, titanium Ti, tantalum Ta or molybdenum alloy Mo ally.

As shown in FIG. 3F, the passivation layer 37 is formed on the entire surface of the lower substrate 31 including the data line 36a by a PECVD deposition method. After that, a third photoresist P/R3 is deposited on the passivation layer 37, and an exposure and developing process is performed thereon using a third mask, thereby forming a third photoresist P/R3 pattern for exposing a predetermined portion of the drain electrode 36c. Then, the passivation layer 37 is selectively etched using the third photoresist pattern as the mask, thereby forming the contact hole 38 of FIG. 1 in the drain electrode 36c. Subsequently, the third photoresist P/R3 pattern is removed. Herein, the passivation layer 37 may be formed of an inorganic insulating material same as that of the gate insulating layer 33, or an organic insulating material such as an acrylic organic compound having a low dielectric constant, BCB and PFCB.

As shown in FIG. 3G, a transparent electrode material is deposited on the entire surface of the lower substrate 31 for being in contact with the drain electrode 36c through the contact hole 38. Then, a fourth photoresist P/R4 is deposited on the transparent electrode material, and then a fourth photoresist P/R4 pattern is formed when patterning the pixel electrode by an exposure and developing process using a fourth mask.

By selectively removing the transparent electrode material with the fourth photoresist P/R pattern as the mask, as shown in FIG. 3H, the pixel electrode 39 is formed in the pixel region. Then, the fourth photoresist P/R4 pattern is removed. The pixel electrode 39 is electrically connected to the drain electrode 36c through the contact hole 38 of FIG. 1. At this time, the active layer 34a is wider than the data line 36a.

In the related art LCD device manufactured in the aforementioned process steps, the active layer 34a is wider than the data line 36a or the source/drain electrode 36b and 36c. After manufacturing the lower substrate (TFT array substrate) according to the aforementioned process steps, an alignment process for aligning liquid crystal molecules, a sealing and spacing process, a bonding process for bonding the first and second substrates to each other, and a scribe/ brake process for dividing the lower substrate into unit cells are sequentially performed. As a result, an LCD panel of the LCD device is completed.

The LCD device displays the picture image by controlling light transmittance of ambient light. That is, the LCD device requires an additional light source such as a backlight for emitting the light to the LCD panel. However, when LCD panel receives light from the backlight, conductivity of the active layer varies because the active layer comprises the amorphous silicon layer (i.e., conductivity of the semiconductor layer varies according to light and heat). Accordingly, when the backlight is turned off, the active layer remains as the amorphous silicon layer. Meanwhile, when the backlight is turned on, the amorphous silicon layer is metallized by the light of the backlight. If the backlight is driven, the amorphous silicon layer is metallized so that it affects the data line 36a because the data line 36a is positioned above the amorphous silicon layer.

Also, the data line 36a and the pixel electrode 39 are adjoining to each other, and a capacitance is generated between the data line 36a and the pixel electrode 39, whereby a capacitance value between the pixel electrode 39 and the data line 36a is changed by turning on/off of the backlight according to turning on/off of inverter since the amorphous silicon layer is metallized. That is, when the backlight is turned on, a capacitance value between the data line 36a and the pixel electrode 39 is different than when the backlight is turned off so that a charge of the pixel electrode 39 varies. Also, the backlight may be driven according to a signal from the inverter circuit. At this time, the amorphous silicon layer may be metallized by turning on/off the backlight according to the turning on/off of the inverter. As a result, the capacitance value between the data line and the pixel electrode may be varied according as the backlight is turned on/off, thereby changing the charge of the pixel electrode.

In the related art LCD device manufactured using the four masks, an electric potential of the pixel electrode 39 may be varied according as the backlight is turned on/off so that luminance may be changed. Thus, a wavy noise phenomenon may be generated such that wave lines are continuously generated from the bottom to the top of an LCD panel.

SUMMARY OF THE INVENTION

Accordingly, the present invention is directed to an LCD device and a method for manufacturing the same that substantially obviates one or more problems due to limitations and disadvantages of the related art.

An object of the present invention is to provide an LCD device and a method for manufacturing the same that prevents a capacitance value from being changed between a pixel electrode and a data line according to turning on/off of a backlight.

Another object of the present invention is to provide an LCD device and a method for manufacturing the same that improves picture quality by preventing a wavy noise in the LCD device.

Additional features and advantages of the invention will be set forth in part in the description which follows, and in part will become apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described, an LCD device comprises an insulating substrate; a gate line disposed on the insulating substrate; a first data line disposed perpendicular to the gate line and separated from the gate line; a second data line disposed crossing the gate line on a same line as the first data line; a thin film transistor disposed substantially at a crossing point of the gate line and the second data line; an active layer disposed below the second data line, a source electrode, and a drain electrode of the thin film transistor; a third data line disposed perpendicular to the gate line to define a pixel region to electrically connect the first and second data lines with each other; and a pixel electrode disposal in the pixel region.

In another aspect, a method for manufacturing an LCD device comprises the steps of forming a gate line and a first data line on an insulating substrate, the gate line having a gate electrode, the first data line being perpendicular to the gate line and spaced apart from the gate line; sequentially depositing a semiconductor layer and a conductive layer after forming a gate insulating layer on an entire surface of the insulating substrate including the gate line and the first data line; forming a second data line on the same layer as the first data line by patterning the semiconductor layer and the metal layer, the second data line having source/drain electrodes perpendicular to the gate line; forming a third data line on the first and second data lines to electrically connect the first and second data lines with each other, thereby defining a pixel region; and forming a pixel electrode in the pixel region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 3A to 3H are cross-sectional views illustrating manufacturing process steps of a related art LCD device taken along lines I–I' and II–II' of FIG. 1;

FIG. 5 is a cross-sectional view illustrating an LCD device taken along lines III–III' and IV–IV' of FIG. 4 according to an embodiment of the present invention; and FIGS. 6A to 6H are cross-sectional views illustrating manufacturing process steps of an LCD device taken along lines III–III' and IV–IV' of FIG. 4.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
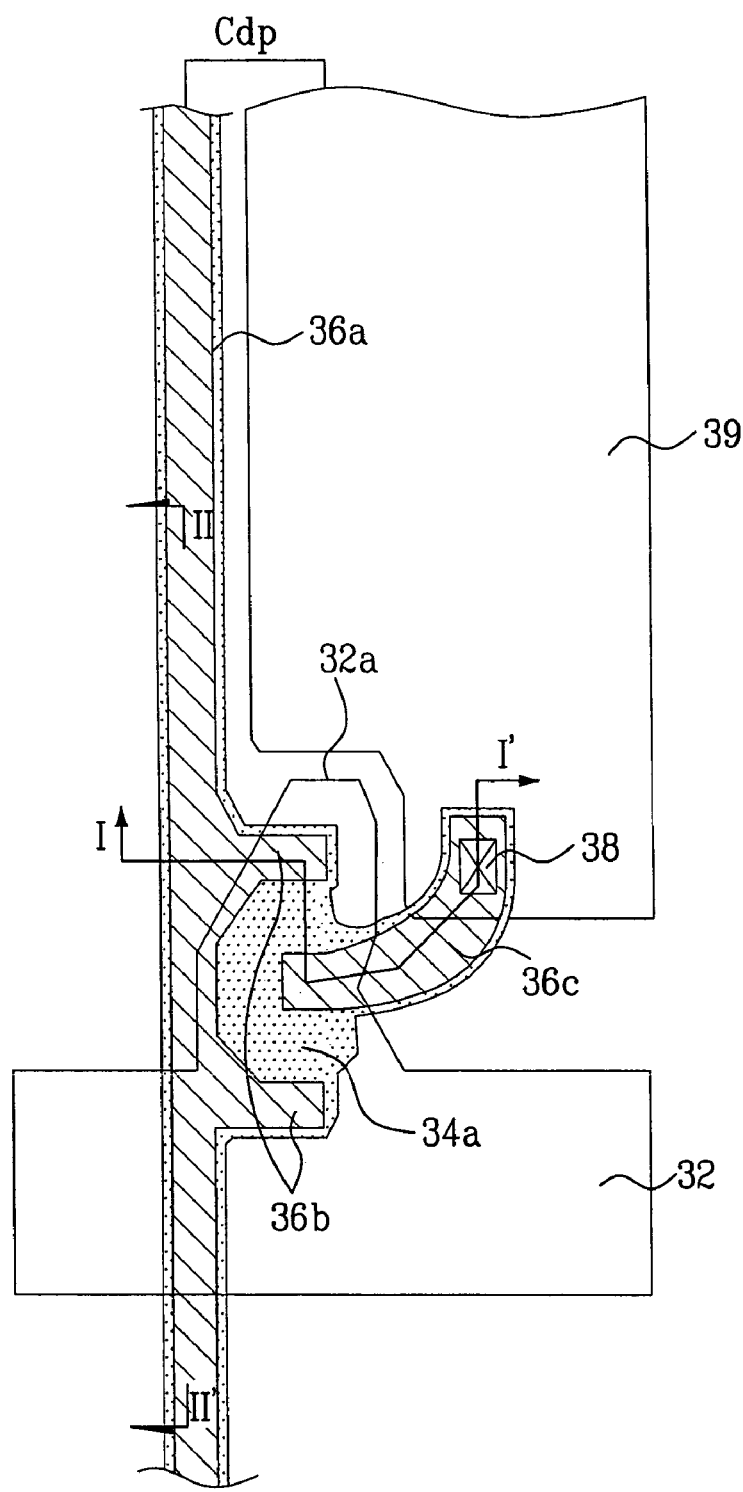
FIG. 1 is an expanded plan view illustrating a unit pixel of a related art LCD device.
Figure 2:
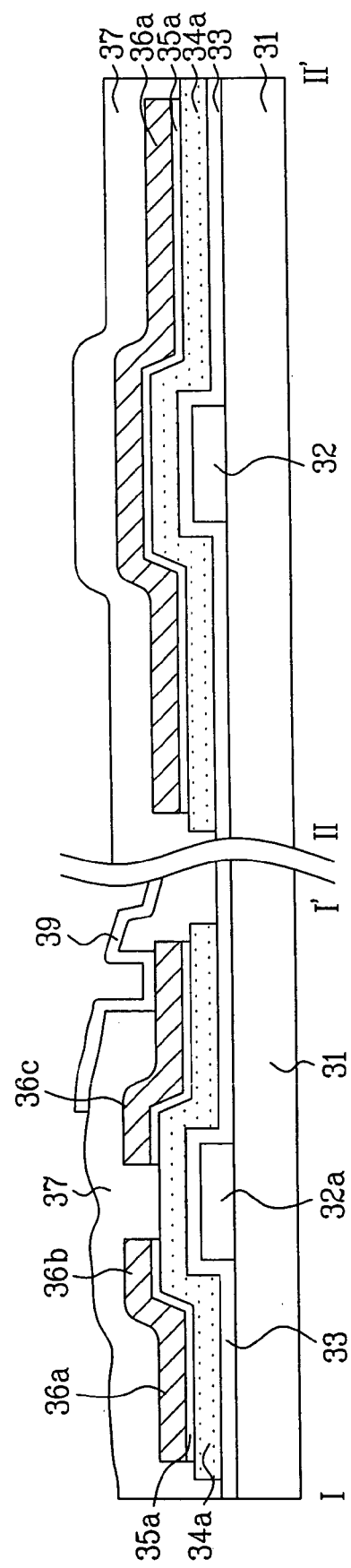
FIG. 2 is a cross-sectional view illustrating a related art LCD device taken along lines I–I' and II–II' of FIG. 1.
Figure 3B:
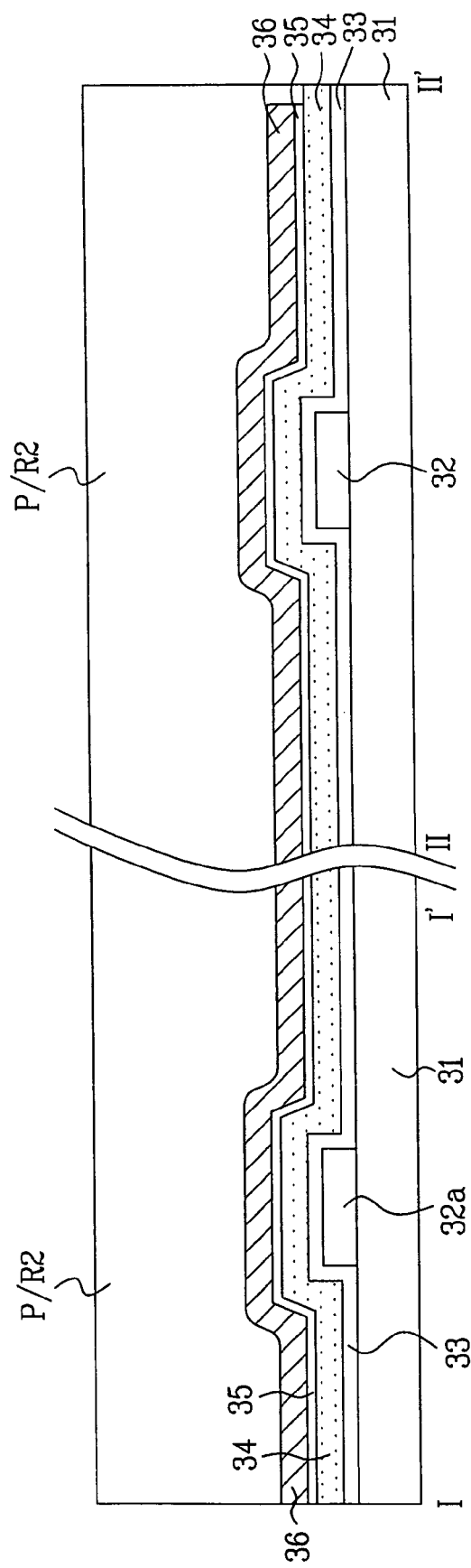
Figure 3C:
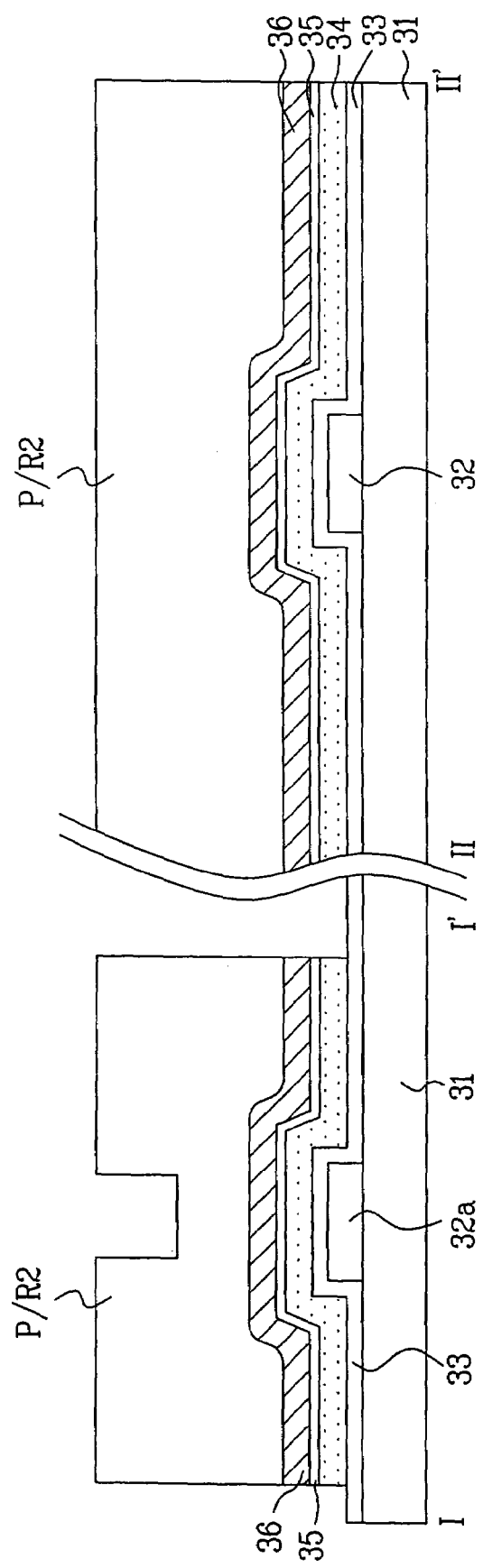
Figure 3D:
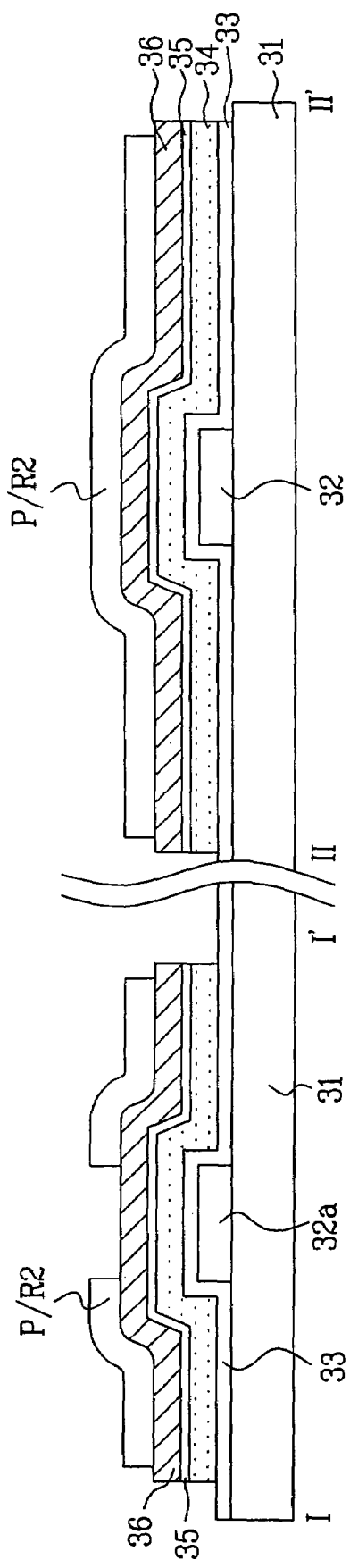
Figure 3E:
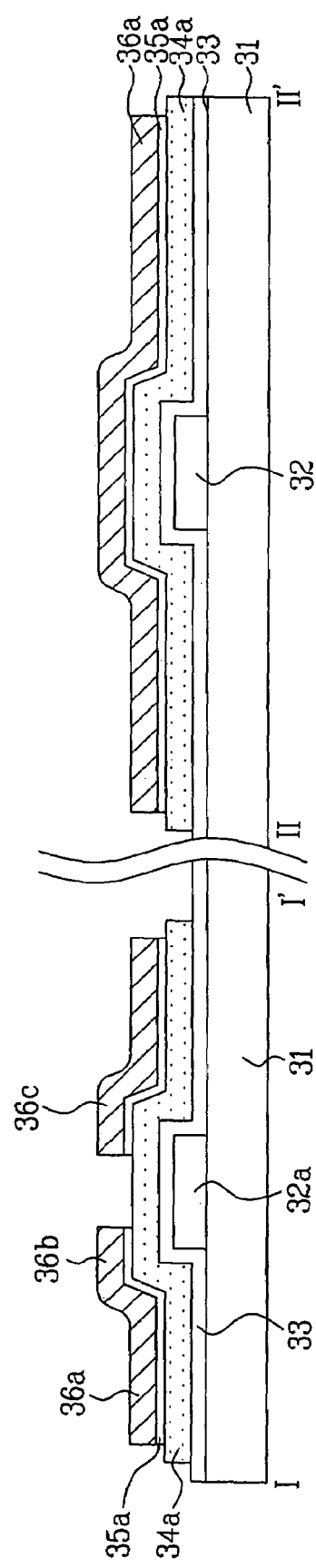
Figure 3F:
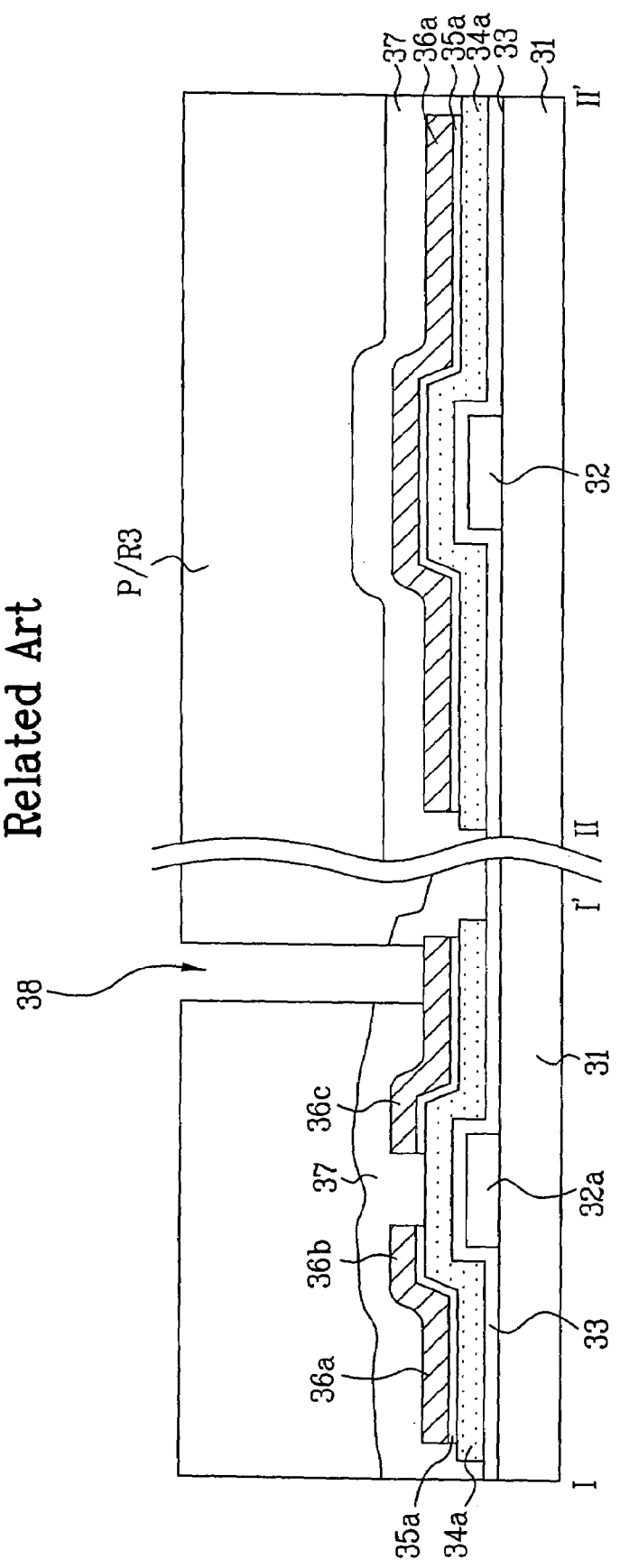
Figure 3G:
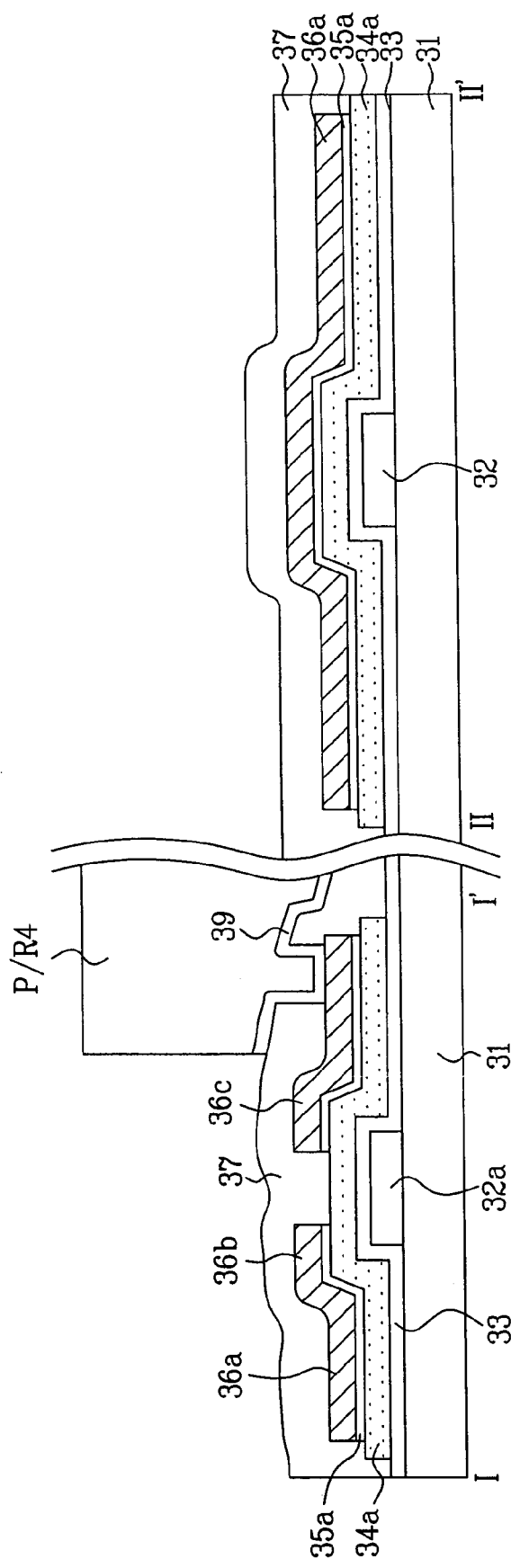
Figure 3H:
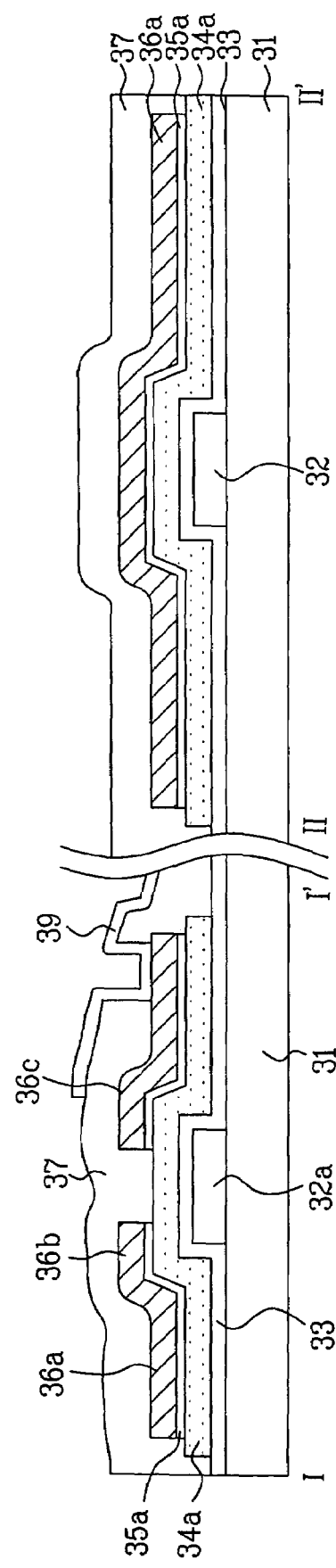
Figure 4:
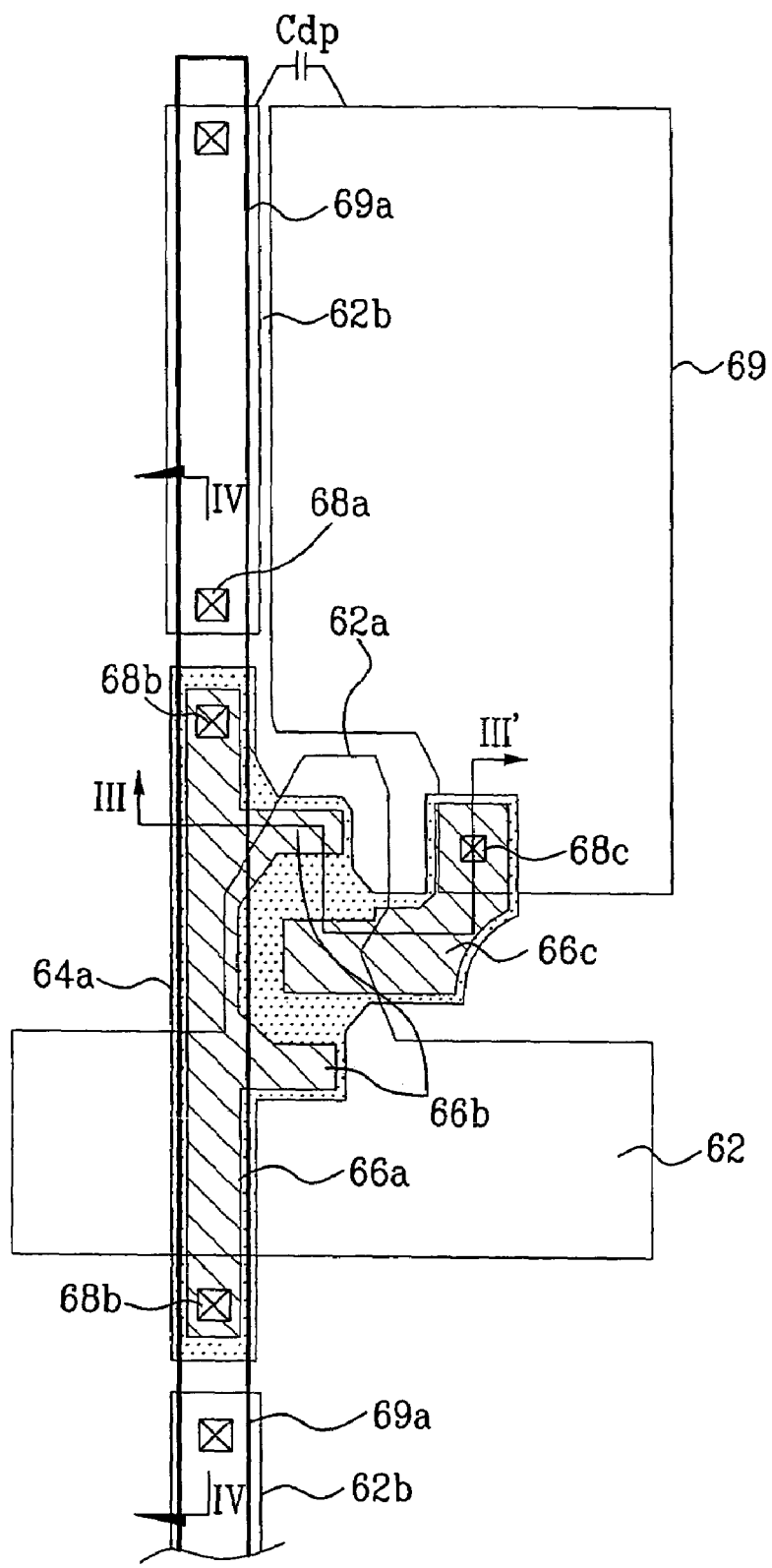
FIG. 4 is an expanded plan view illustrating an unit pixel of an LCD device according to an embodiment of the present invention.

Hereinafter, an LCD device and a method for manufacturing the same according to the preferred embodiment of the present invention will be described with reference to the accompanying drawings. First, the LCD device according to the present invention will be described as follows. FIG. 4 is an expanded plan view illustrating an unit pixel of an LCD device according to an embodiment of the present invention, and FIG. 5 is a cross-sectional view illustrating an LCD device taken along lines III–III' and IV–IV' of FIG. 4 according to an embodiment of the present invention.

As shown in FIGS. 4 and 5, the LCD device includes a gate line 62 on a lower substrate 61 in one direction and a gate electrode 62a extending from the gate line 62. Then, a first data line is formed on the same layer as the gate line 62 perpendicular to the gate line 62 at a predetermined interval from the gate line 62. After that, a gate insulating layer 63 is formed on an entire resultant surface of the lower substrate 61 including the gate line 62, and a second data line 66a crossing the gate line 62 is formed on the gate insulating layer 63 between the first data lines 62b. A thin film transistor is formed at a crossing point of the gate line 62 and the second data line 66a.

Specifically, the thin film transistor comprises a source electrode 66b protruding from the second data line 66a, a drain electrode 66c being apart from the source electrode 66b, and the gate electrode 62a extending from the gate line 62. At this time, the source electrode 66b protrudes from the second data line 66a to have a 'C'-shaped groove, and the drain electrode 66c is formed apart from the source electrode 66b inside the 'C'-shaped groove. That is, a channel region is formed in a 'C'-shape between the source and drain electrodes 66b and 66c.

On the plan view of FIG. 4, the first data line 62b is formed on the same line as the second data line 66a to be apart from the second data line 66a at a predetermined interval. Also, the first data lines 62b are formed at lower and upper portions of the second data line 66a. At this time, the first data line 62b is adjacent to a pixel electrode 69. Then, an active layer 64a is formed on the gate insulating layer 63 corresponding to the gate electrode 62a. The active layer 64a is formed below the thin film transistor and the second data line 66a to have an enough width to cover the second data line 66a. At this time, the active layer 64a is formed of an amorphous silicon layer.

Also, an ohmic contact layer 65a of $n^+$ amorphous silicon layer is formed on the active layer 64a corresponding to the second data line 66a, the source electrode 66b and the drain electrode 66c except the channel region. Then, a passivation layer 67 is formed on the entire surface of the lower substrate 61 including the second data line 66. The passivation layer 66 has first to third contact holes 68a, 68b and 68c for respectively exposing both sides of the first data line 62b, both sides of the second data line 66a, and a predetermined portion of the drain electrode 66c. Herein, the pixel electrode 69 is formed in the pixel region in contact with the drain electrode 66c through the third contact hole 68c. Also, a third data line 69a is formed on the same layer as the pixel electrode 69 for being electrically connected to the first and second data lines 62b and 66a through the first and second contact holes 68a and 68b. At this time, the third data line 69a is formed perpendicular to the gate line 62, thereby defining the pixel region. The pixel electrode 69 and the third data line 69a are formed of a transparent electrode material such as Indium-Tin-Oxide (ITO), Tin-Oxide (TO) or Indium-Zinc-Oxide (IZO).

As mentioned above, the first and second data lines 62b and 66a are connected to the third data line 69a through the first and second contact holes 68a and 68b, whereby the first, second and third data lines 62b, 66a and 69a operate together to serve as a substantial data line. Instead of forming the active layer 64a under the first data line 62b being adjacent to the pixel electrode 69, the first and third data lines 62b and 69a are formed of a transparent conductive material. Thus, it is possible to prevent a capacitance value $C_{dp}$ between the pixel electrode 69 and the adjacent data line (first or third data line) from being changed by turning on/off of Inverter for driving the backlight.

The method for manufacturing the LCD device having the aforementioned structure, in which four masks are used, will be described as follows. FIGS. 6A to 6H are cross-sectional views illustrating manufacturing process steps of an LCD device taken along lines III–III' and IV–IV' of FIG. 4.

As shown in FIG. 6A, a gate metal layer is formed of at least one of chrome Cr, aluminum Al, aluminum alloy AlNd, tantalum Ta and molybdenum Mo. Then, a first photoresist P/R1 is deposited on the gate metal layer, and then an exposure and developing process is performed thereon using a first mask, thereby forming a first photoresist P/R1 pattern for forming the gate line and the first data line. Subsequently, the gate metal layer is selectively removed using the first photoresist P/R1 pattern as a mask, thereby simultaneously forming the gate line 62 extending in one direction, the gate electrode 62a extending from the gate line 62, and the first data line 62b extending perpendicular to the gate line 62 and being apart from the gate line 62. After that, the first photoresist P/R1 pattern is removed.

In the plan view of the LCD device shown in FIG. 4, the first data lines 62b are formed on the same line as the second data line 66a at the lower and upper portions of the second data line 66a. Instead of forming the gate metal layer as a single layer, the gate metal layer may be formed as a dual-layer structure of lower and upper layers. At this time, the lower layer of the gate metal layer may be formed of aluminum Al or aluminum-neodymium alloy AlNd, for example, and the upper layer may be formed of molybdenum Mo, for example. Also, the lower layer may be formed of chrome Cr, and the upper may be formed of aluminum-neodymium alloy AlNd, for example. If the gate metal layer is formed as a dual-layer structure, RC delay of a signal flowing in the gate line and the first data line can be decreased since the aluminum metal used for the lower layer of the gate line and the first data line has a low resistance value. Also, it is possible to prevent the molybdenum Mo from being etched by an etchant since the molybdenum Mo used for the upper layer has greater corrosion-resistance characteristics to chemicals, thereby preventing the line from being disconnected.

As shown in FIG. 6B, the gate insulating layer 63 is formed on the entire surface of the lower substrate 61 including the gate line 62 and the first data line 62b. Then, first and second semiconductor layers 64 and 65 are sequentially formed on the gate insulating layer 63, and a data metal layer 66 is formed on the entire surface of the lower substrate 61. The data metal layer 66 is formed of chrome Cr, tantalum Ta or titanium Ti. At this time, the first and second semiconductor layers are formed of amorphous silicon layer and $n_+$ amorphous silicon layer. After that, a second photoresist P/R2 is deposited on the data metal layer 66.

Figure 6C:
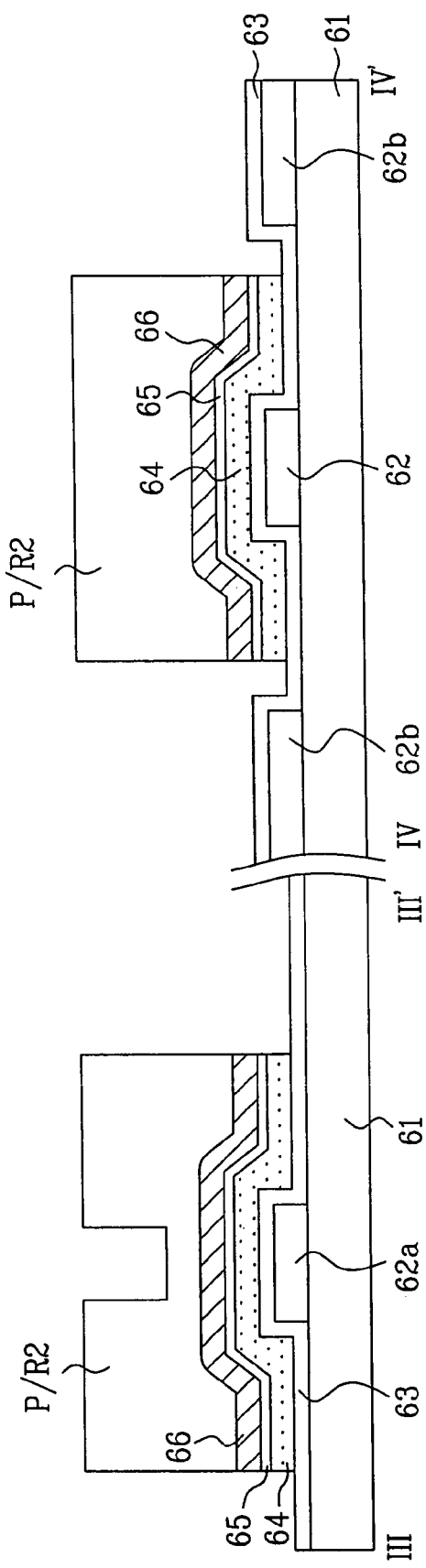

Referring to FIG. 6C, an exposure and developing process using a second mask (half-tone mask) having a diffraction exposing portion is performed on the data metal layer 66 above the channel region, thereby forming a second photoresist P/R2 pattern for forming the second data line and the active layer of the thin film transistor at a predetermined thickness. The second mask (half-tone mask) is formed to completely exclude the light from the portion corresponding to the second data line and to partially transmit the light in the portion corresponding to the channel region of the thin film transistor. Accordingly, the developed second photoresist P/R2 pattern is maintained at the predetermined (deposited) thickness in the portion of the second data line while the developed second photoresist P/R2 pattern is relatively thin in the channel region of the thin film transistor. Subsequently, the data metal layer 66 and the first and second semiconductor layers 64 and 65 are removed in wet or dry process using the second photoresist P/R2 pattern. At this time, the data metal layer 66 is removed above the first data line 62*b*.

Figure 6D:
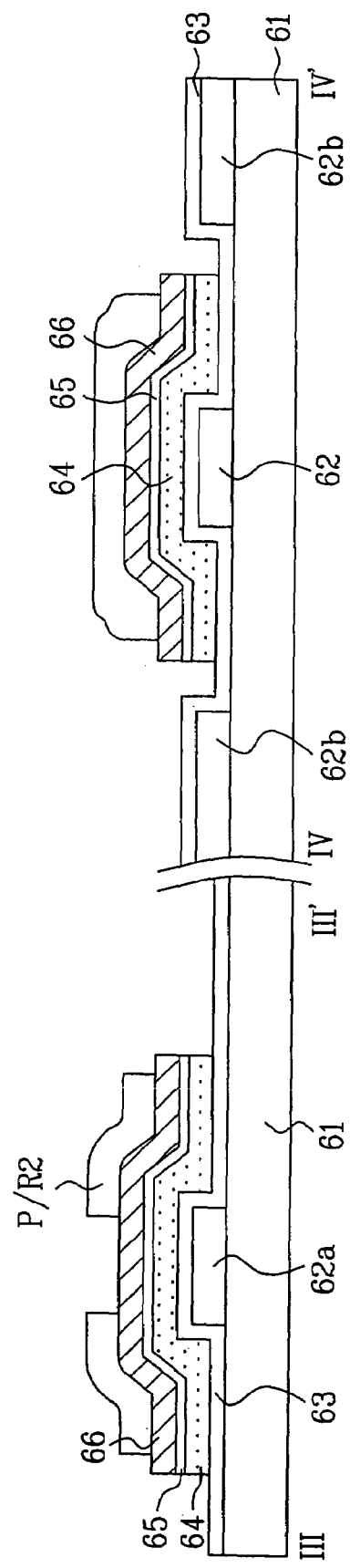

As shown in FIG. 6D, the second photoresist P/R2 corresponding to the channel region of the thin film transistor is removed by ashing the second photoresist P/R2 pattern. At this time, the second photoresist P/R2 pattern totally becomes thin and narrow. Accordingly, the widths of the data line and the source/drain electrodes, which will be formed in the next process steps, become changed.

Figure 6E:
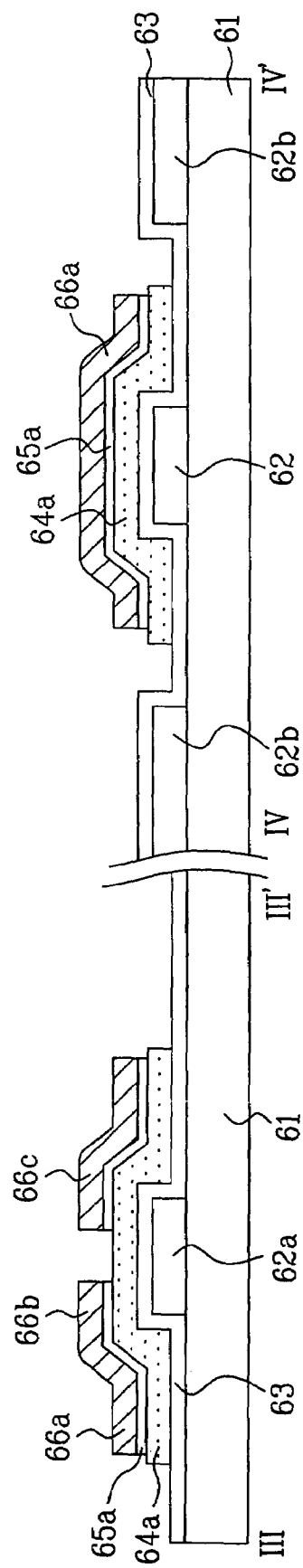

Referring to FIG. 6E, after the ashing process, the data metal layer 66 and the second semiconductor layer 65 corresponding to the channel region of the thin film transistor are etched using the second photoresist P/R2 pattern as the mask. After forming the thin film transistor having the second data line 66*a*, the source electrode 66*b* and the drain electrode 66*c*, the second photoresist P/R2 pattern is removed. Accordingly, the source and drain electrodes 66*b* and 66*c* are divided from each other, and the active layer 64*a* comprising the first semiconductor layer 64 is formed by exposing the first semiconductor layer 64 of the channel region. Also, the ohmic contact layer 65*a* is formed on the active layer 64*a* except the channel region. Herein, the gate insulating layer 63 is formed of an inorganic insulating material such as oxide silicon SiOx or nitride silicon SiNx. The data metal layer is formed of molybdenum Mo, titanium Ti, tantalum Ta or molybdenum alloy Mo ally.

At this time, the source electrode 66*b* is partially overlapped with one side of the gate electrode 62*a*, thereby forming the 'C'-shaped groove. Also, the drain electrode 66*c* is overlapped with the other side of the gate electrode 62*a*, whereby the drain electrode 66*c* is formed to be apart from the source electrode 66*b* inside the 'C'-shaped groove. Thus, the channel region is formed in the 'C'-shape between the source electrode 66*b* and the drain electrode 66*c*.

Figure 6F:
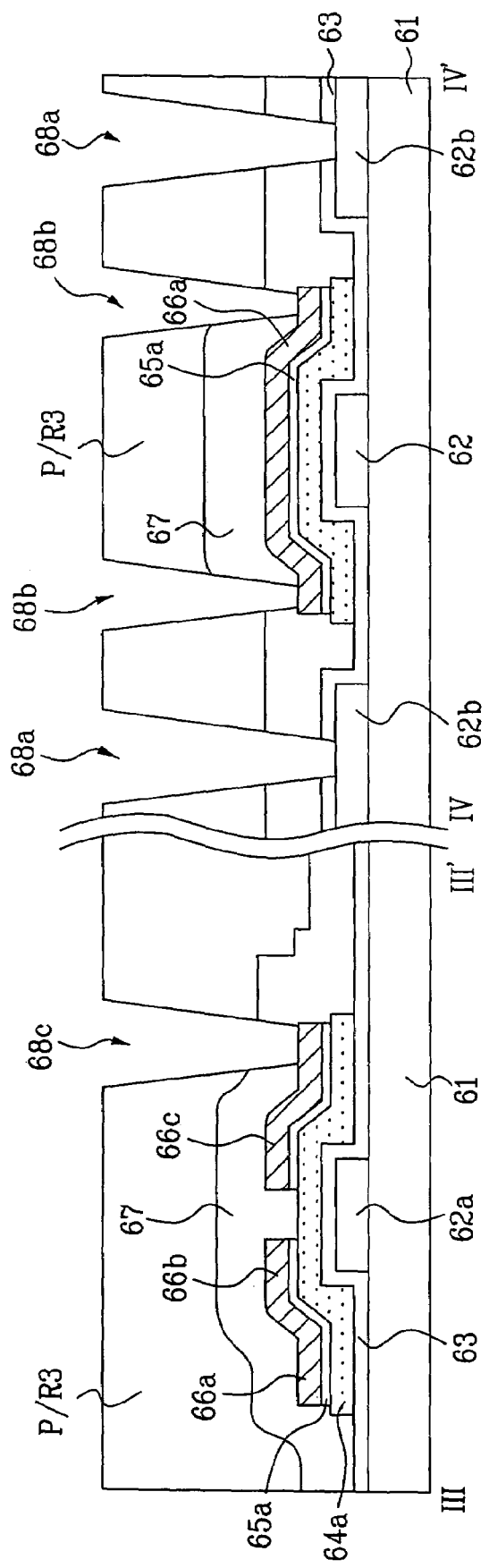

As shown in FIG. 6F, the passivation layer 67 is formed on the entire surface of the lower substrate 61 including the second data line 66*a* by the PECVD deposition method. The passivation layer 67 is formed of an inorganic insulating layer such as silicon nitride layer or silicon oxide layer, or an organic insulating layer such as BenzocycloButene (BCB) or acrylic resin. Next, a third photoresist P/R3 is deposited on the passivation layer, and then, an exposure and developing process is performed thereon with a third mask, thereby forming a third photoresist P/R3 pattern for exposing the both sides of the first data line 62*b*, the both sides of the second data line 66*a*, and a predetermined portion of the drain electrode 66*c*. Subsequently, the passivation layer 67 and the gate insulating layer 63 are selectively removed using the third photoresist P/R3 pattern as the mask, thereby forming the first contact hole 68*a* on the both sides of the first data line 62*b*, the second contact hole 68*b* on the both sides of the second data line 66*a*, and the third contact hole 68*c* on the predetermined portion of the drain electrode 66*c*. Then, the third photoresist P/R3 pattern is removed.

Figure 6G:
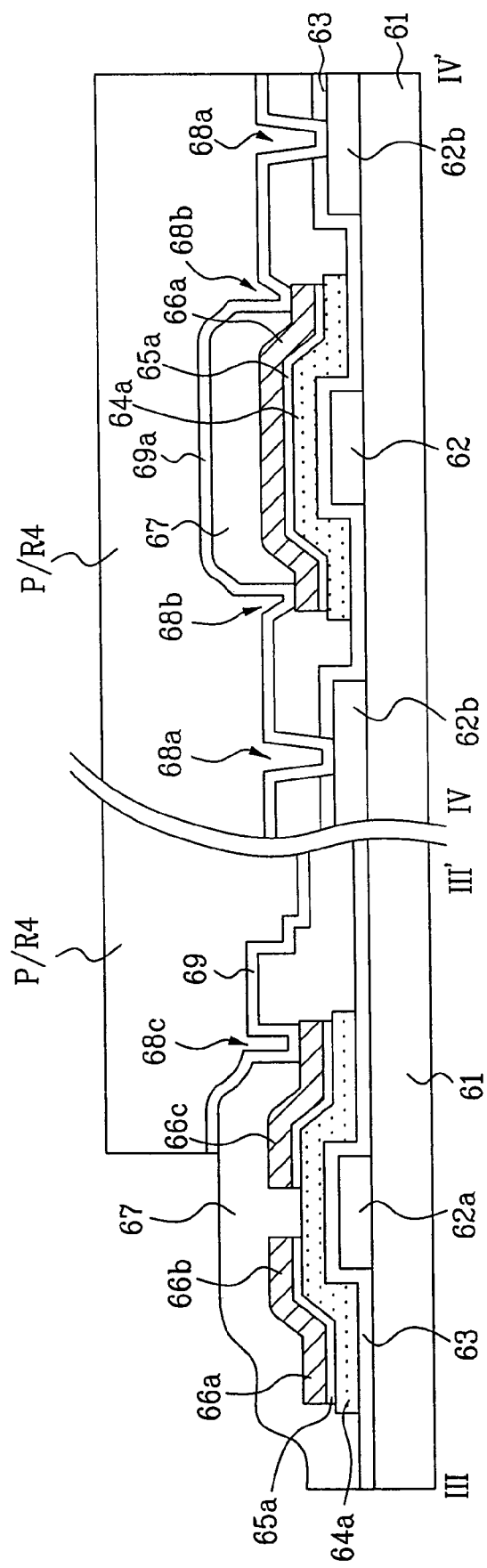

As shown in FIG. 6G, the transparent electrode material is deposited on the entire surface of the lower substrate to be in contact with the first data line 62*b* through the first contact hole 68*a*, the second data line 66*a* through the second contact hole 68*b*, and the drain electrode 66*c* through the third contact hole 68*c*. Then, a fourth photoresist P/R4 is deposited on the transparent electrode material, and an exposure and developing process is performed thereon using a fourth mask, whereby a fourth photoresist P/R4 pattern is formed when patterning the pixel electrode and the third data line.

Referring to FIG. 6H, the transparent electrode material is selectively removed using the fourth photoresist P/R4 as the mask, thereby simultaneously forming the pixel electrode in the pixel region, and the third data line 69*a* in contact with the first and second data lines 62*b* and 66*a* through the first and second contact holes 68*a* and 68*b*. Then, the fourth photoresist P/R4 pattern is removed. At this time, the transparent electrode material is formed of Indium-Tin-Oxide (ITO) or Indium-Zinc-Oxide (IZO). The third data line 69*a* is formed to connect the first and second data lines 62*b* and 66*a* to each other through the first and second contact holes 68*a* and 68*b*. Herein, the first to third data lines 62*b*, 66*a* and 69*a* are operated together to serve as the substantial data line.

The active layer 64*a* of the amorphous silicon layer is not formed below the first and third data lines 62*b* and 69*a* being adjacent to the pixel electrode 69, but formed below the second data line 66*a* and the source/drain electrode 66*b* and 66*c*, which are not adjacent to the pixel electrode 69. That is, the active layer 64*a* of the amorphous silicon layer is not formed below the first and third data lines 62*b* and 69*a* being adjacent to the pixel electrode 69.

After manufacturing the lower substrate (TFT array substrate) according to the aforementioned process steps, an alignment process for aligning liquid crystal molecules, a sealing and spacing process, a bonding process for bonding the first and second substrates to each other, and a scribe/brake process for dividing the lower substrate into unit cells are sequentially performed. As a result, an LCD panel of the LCD device is completed. The LCD device displays the picture image by controlling light transmittance of ambient light. That is, the LCD device requires an additional light source such as a backlight for emitting the light to the LCD panel. The backlight generally emits the light to the LCD panel by receiving a driving signal through the inverter.

The active layer of the amorphous silicon layer is not formed below the first and third data lines 62*b* and 69*a* being adjacent to the pixel electrode 69 so that it doe not have an effect on the pixel electrode 69 even though the active layer 64*a* of the amorphous silicon layer is metallized by the light from the backlight according as the inverter is turned on. Thus, it is possible to prevent changes in the capacitance value between the pixel electrode and the data line resulting from turning on/off the backlight according to the turning on/off of the inverter.

As mentioned above, the LCD device and the method for manufacturing the same according to the present invention have the following advantages. For example, the active layer of the amorphous silicon layer is not formed below the first and third data lines being adjacent to the pixel electrode, thereby preventing changes in the capacitance value between the pixel electrode and the data line resulting from turning on/off the backlight according to the turning on/off of the inverter, thereby preventing a wavy noise failure. As a result, a picture quality is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An LCD device, comprising:
   an insulating substrate;
   a gate line disposed on the insulating substrate;
   a first data line disposed perpendicular to the gate line and separated from the gate line;
   a second data line disposed crossing the gate line on a same line as the first data line;
   a thin film transistor disposed substantially at a crossing point of the gate line and the second data line;
   an active layer disposed below the second data line, a source electrode, and a drain electrode of the thin film transistor, wherein the second data line completely overlaps the active layer;
   a third data line disposed perpendicular to the gate line to define a pixel region to electrically connect the first and second data lines with each other; and
   a pixel electrode disposed in the pixel region.

2. The LCD device according to claim 1, wherein the first data line is formed on the same layer as the gate line with the same material as the gate line.

3. The LCD device according to claim 1, wherein the gate line and the first data line are formed of at least one of chrome (Cr), aluminum (Al), aluminum alloy (AlNd), tantalum (Ta) and molybdenum (Mo).

4. The LCD device according to claim 1, wherein the first data line is formed adjacent to the pixel electrode.

5. The LCD device according to claim 1, further comprising a passivation layer formed over an entire surface of the insulating substrate including the second data line.

6. The LCD device according to claim 5, wherein the passivation layer includes first, second and third contact holes respectively formed on both sides of the first data line, on both sides of the second data line, and on a predetermined portion of the drain electrode.

7. The LCD device according to claim 6, wherein the third data line electrically connects the first and second data lines to each other through the first and second contact holes.

8. The LCD device according to claim 1, wherein the thin film transistor includes:
   a source electrode protruding from the second data line;
   a drain electrode being apart from the source electrode; and
   a gate electrode extending from the gate line.

9. The LCD device according to claim 8, wherein the source electrode is partially overlapped on a first side of the gate electrode to define a 'C'-shaped groove.

10. The LCD device according to claim 9, wherein the drain electrode is partially overlapped on a second side of the gate electrode to be spaced apart from the source electrode such that the drain electrode is disposed inside the 'C'-shaped groove.

11. The LCD device according to claim 8, further comprising an ohmic contact layer on the active layer corresponding to the second data line, the source electrode, and the drain electrode except a channel region.

12. The LCD device according to claim 1, wherein the pixel electrode is formed on the same layer as the third data line.

13. The LCD device according to claim 12, wherein the pixel electrode and the third data line are formed of a transparent electrode material such as Indium-Tin-Oxide (ITO), Tin-Oxide (TO) or Indium-Zinc-Oxide (IZO).

14. The LCD device according to claim 1, wherein the second data line is formed by sequentially depositing an amorphous silicon layer, an $n^+$ amorphous silicon layer and a metal layer.

15. A method for manufacturing an LCD device, comprising the steps of:
   forming a gate line and a first data line on an insulating substrate, the gate line having a gate electrode extended therefrom, the first data line being perpendicular to the gate line and spaced apart from the gate line;
   sequentially depositing a semiconductor layer and a conductive layer after forming a gate insulating layer on an entire surface of the insulating substrate including the gate line and the first data line;
   forming a second data line on the same layer as the first data line and perpendicular to the gate line by patterning the semiconductor layer and the conductive layer, the second data line having source/drain electrodes extended therefrom, wherein the second data line completely overlaps the semiconductor layer;
   forming a third data line on the first and second data lines to electrically connect the first and second data lines with each other, thereby defining a pixel region; and
   forming a pixel electrode in the pixel region.

16. The method according to claim 15, wherein the first data line is formed on the same layer as the gate line at the same time.

17. The method according to claim 15, wherein the gate line and the first data line are formed of at least one conductive metal layer of chrome (Cr), aluminum (Al), aluminum alloy (AlNd), tantalum (Ta) and molybdenum (Mo).

18. The method according to claim 15, wherein the first data line is formed adjacent to the pixel electrode.

19. The method according to claim 15, wherein the step for forming the second data line having the source/drain electrodes includes the steps of:
   sequentially depositing first and second semiconductor layers and the conductive layer on the gate insulating layer;
   patterning a photoresist pattern on the conductive layer using a half-tone mask having a diffraction exposing portion above a channel region;
   etching the conductive layer and the first and second semiconductor layers using the photoresist pattern;
   ashing the photoresist pattern to expose the conductive layer above the channel region;
   forming the separated source and drain electrodes, and the second data line by etching the conductive layer and the second semiconductor layer to expose the first semiconductor layer of the channel region while simultaneously forming an ohmic contact layer on an active layer except the channel region; and
   removing the photoresist pattern.

20. The method according to claim 19, wherein the source electrode is partially overlapped on a first side of the gate electrode to define a 'C'-shaped groove.

21. The method according to claim 20, wherein the drain electrode is partially overlapped on a second side of the gate electrode to be spaced apart from the source electrode such that the drain electrode is disposed inside the 'C'-shaped groove.

22. The method according to claim 15, further comprising a step for forming a passivation layer formed over an entire surface of the insulating substrate including the second data line.

23. The method according to claim 22, wherein the passivation layer is formed of at least one of silicon nitride, silicon oxide, BenzocycloButene (BCB), and acrylic resin.

24. The method according to claim 22, wherein the passivation layer includes first, second and third contact holes respectively formed on both sides of the first data line, on both sides of the second data line, and on a predetermined portion of the drain electrode.

25. The method according to claim 24, wherein the third data line electrically connects the first and second data lines to each other through the first and second contact holes.

26. The method according to claim 15, wherein the pixel electrode is formed on the same layer as the third data line at the same time.

27. The method according to claim 15, wherein the pixel electrode and the third data line are formed of a transparent electrode material such as Indium-Tin-Oxide (ITO), Tin-Oxide (TO) or Indium-Zinc-Oxide (IZO).

28. An LCD device, comprising:
an insulating substrate;
a gate line disposed on the insulating substrate substantially along a first line in a first direction;
a first data line disposed perpendicular to the gate line substantially along a second line in a second direction, the first data line defining a separation so that the first data line is absent at a region where the second line crosses the gate line;
a second data line disposed crossing the gate line substantially along the second line;
a thin film transistor disposed adjacent to a crossing point of the gate line and the second data line, the thin film transistor having a source electrode and a drain electrode;
an active layer disposed below the second data line including a portion thereof at the second line, a source electrode, and a drain electrode of the thin film transistor, wherein the second data line completely overlaps the active layer; and
a third data line to electrically connect the first and second data lines with each other.

29. The LCD device according to claim 28, further comprising a pixel electrode electrically connected to the drain electrode.

* * * * *